No. 737,210.

PATENTED AUG. 25, 1903.

S. G. COLT.
ELECTRIC STOP MECHANISM.
APPLICATION FILED SEPT. 23, 1901.

NO MODEL.

3 SHEETS—SHEET 2.

Witnesses

Inventor
Samuel G. Colt.
By his Attorney

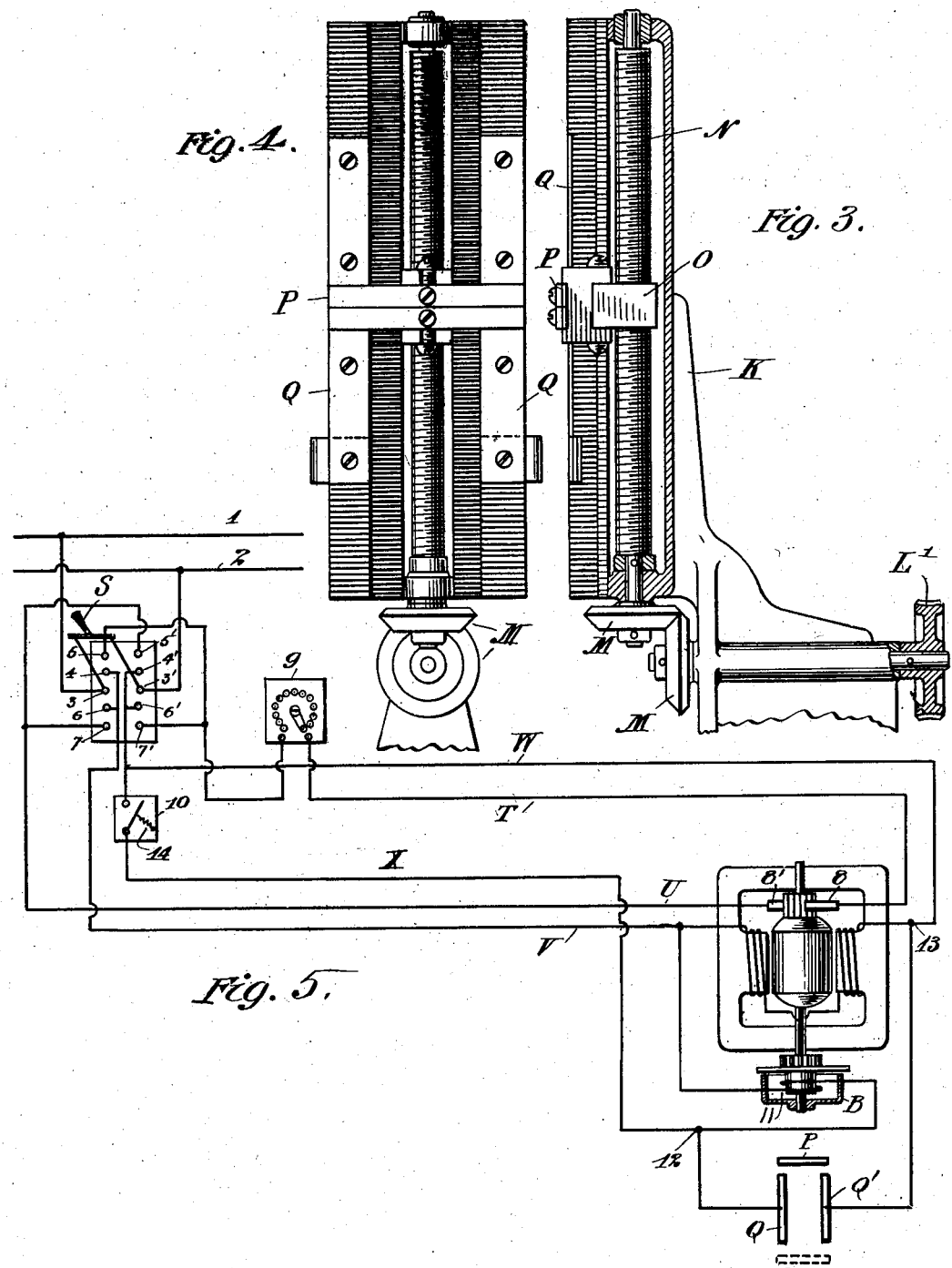

No. 737,210. Patented August 25, 1903.

UNITED STATES PATENT OFFICE.

SAMUEL G. COLT, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

ELECTRIC STOP MECHANISM.

SPECIFICATION forming part of Letters Patent No. 737,210, dated August 25, 1903.

Application filed September 23, 1901. Serial No. 76,168. (No model.)

*To all whom it may concern:*

Be it known that I, SAMUEL GILBERT COLT, a citizen of the United States, residing at Pittsfield, Massachusetts, have invented certain new and useful Improvements in Electric Stop Mechanism, of which the following is a full, clear, and exact description.

My invention relates to stop mechanism for gate-valves or other devices having a definitely-limited movement and operated by motors, and has for its object to provide a means for preventing injury to the gate-valve or motor through inattention of the attendant operating the motor. The chief danger in the case of valves lies in the fact that the instant the valve becomes tight shut or full open any continued operation of the gearing would be liable to result in the stripping of the threads on the valve-stem or the breaking of nuts, and thus rendering the valve useless or in injury to other parts of the system.

Since the motor is required to do work up to the very instant that the valve becomes tight shut or fully open, I avoid the danger referred to above by disconnecting the motor from the gearing at that particular instant, so that any further action on the part of the motor, even through the inertia of its armature, is not transmitted to the valve-stem.

The embodiment of my invention as applied to gate-valves is shown in the accompanying drawings, in which—

Figure 1:
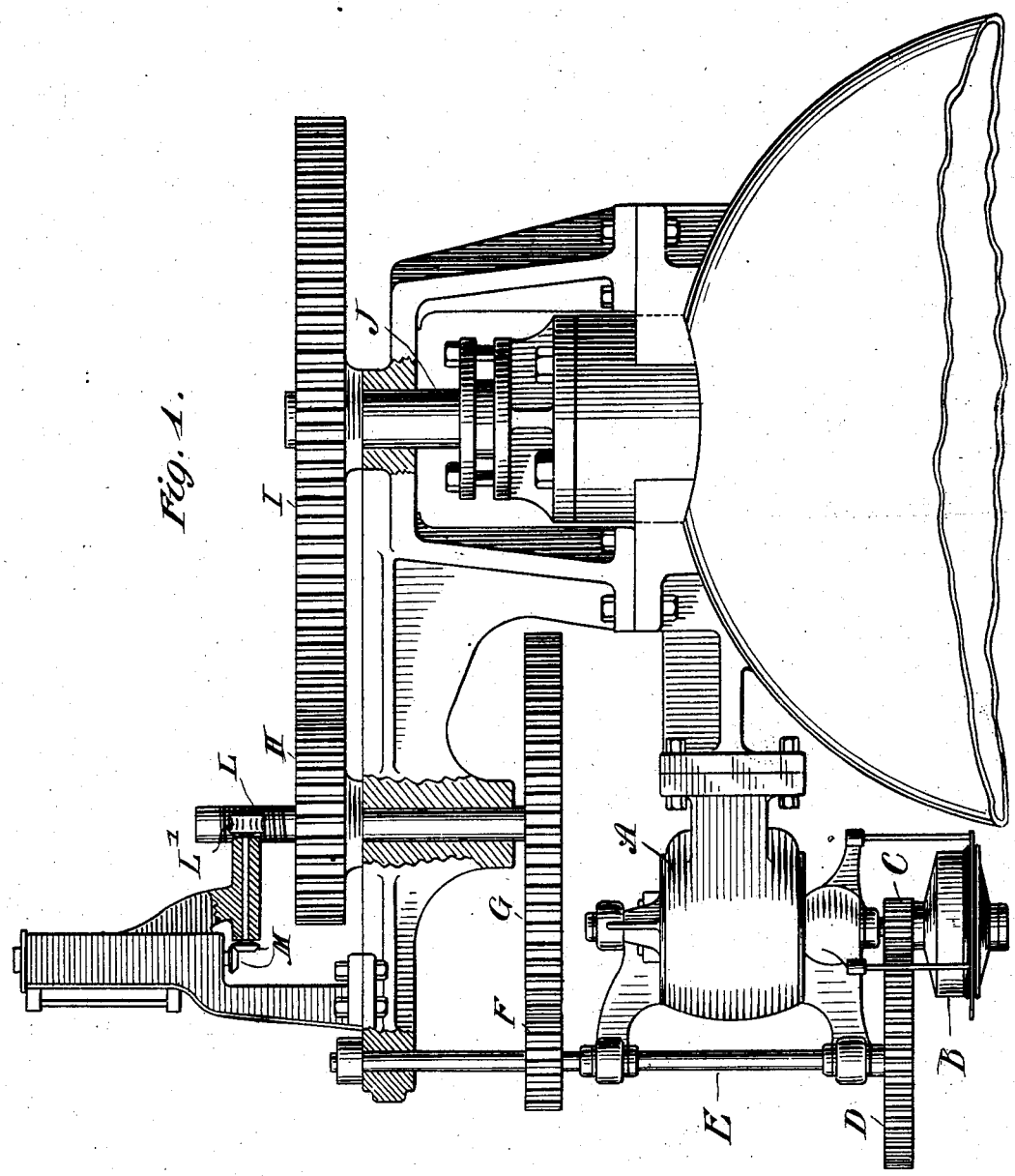
Figure 2:
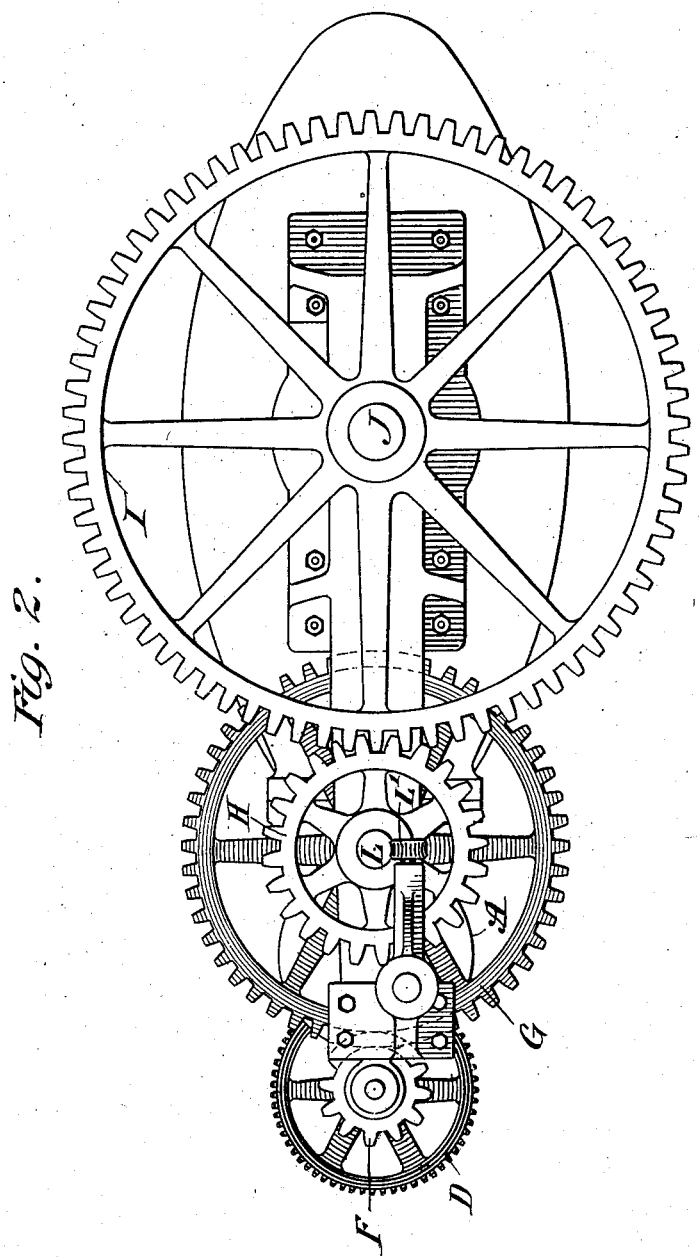

Figure 1 is a side elevation. Fig. 2 is a plan view. Fig. 3 is a detail view. Fig. 4 is a detail view, and Fig. 5 a diagram of circuits.

Referring to the drawings more particularly, A represents an electric motor supplied with current from any convenient source, having upon its shaft an electromagnetic clutch B, one member of which rotates with the shaft, while the other is mounted so as to rotate freely thereon. This second member carries a gear C, which engages with a gear D, attached to the shaft E, which also carries the gear F. The gear F meshes with the gear G, which transmits motion to the gear H, which in turn meshes with the gear I, mounted upon the valve-stem J, so that when the electric clutch B is operated the movement of the motor A is transmitted through the gears to the valve-stem J. Upon the upper end of the shaft which carries the gears G and H is a circuit-breaking device K, consisting of a worm L, which operates a gear L', by which motion is transmitted through bevel-gears M to a screw N, the rotation of which causes the block O, carrying the slide P, to move in one direction or the other. The slide P bears upon conducting-strips Q' for the purpose hereinafter described.

Referring to the diagram of circuits, 1 2 are mains from which the current operating the motor is derived. These are connected to contacts 3 3' of a double-throw switch S, which in one position connects the contacts 4 5 and 4' 5', respectively, with the mains 1 and 2 and in the other position connects the contacts 6 7 and 6' 7', respectively, with the mains 1 and 2. From the terminals 5 and 7' the conductor T leads to one of the armature-brushes, 8, the other armature-brush, 8', being connected to the terminals 5' and 7 by the conductor V. The terminals 4 6 and 4' 6' are connected, respectively, to opposite terminals of the motor field-coils by the conductors V and W. With these connections it will be seen that the double-throw switch S constitutes a reversing-switch. The field-magnet is connected so as to be of the same polarity whichever way the switch is thrown while the armature connections are reversed, so that throwing the switch S reverses the direction of the motor.

9 is a starting-box in the armature-circuit used in starting the motor from rest.

10 is a spring-retracted switch having one terminal connected with the contacts 4' and 6' and whereby the circuit X, through the clutch-energizing coil 11, can be normally closed. The contact-pieces Q Q' are electrically connected to the conductors X and W at 12 and 13, so that when engaged by the slide P they also complete the circuit through the clutch-energizing coil 11. It will thus be seen that the circuit for the clutch B may be completed in two different ways—one by closing by hand the spring-retracted switch 10, and the other through the slide P and contacts Q Q'. This slide P is mechanically operated by the valve-gearing in such a manner that the circuit is broken and the magnetic clutch B deënergized and opened at the instant the valve becomes tight shut or fully open.

The operation of this arrangement is as follows: Suppose the valve to be tight shut and it is desired to open the same. First, the double-throw switch is thrown into the position which will produce the desired direction of rotation of the motor A. The motor is then brought to full speed by means of the starting-box 9. As no current is now flowing through the clutch B (the clutch-circuit being broken at the switch 10 and at the contact device or slide P) the motor continues to run without operating the clutch. If now the spring-retracted hand-switch 10 is closed, thus completing the circuit X through the clutch B, the clutch will operate so that the movement of the motor will be transmitted through the gearing and the valve will begin to open. As soon as the valve has started to open the slide P will make contact with the plates Q Q', thus completing a circuit for the magnetic clutch B in addition to the circuit through the spring-retracted switch 10. It is now no longer necessary to keep the spring-retracted switch 10 closed. The attendant, therefore, releases it and its spring 14 throws it open. The motor continues to open the valve until the slide P leaves the conducting-strips Q Q', and thus automatically breaks the circuit through the clutch, the parts being so proportioned that this will take place when the valve is fully open. The valve-stem will now cease to revolve, although the motor will continue to run until it is stopped by the opening of the double-throw switch S. The operation in closing the valve is the same, except that the main or double-throw switch is placed in the opposite position, so as to reverse the motor, in which case the motor operates the valve-stem until the contact P breaks connection at the other ends of the conducting-strips Q Q'.

It will thus be seen that the power of the motor is automatically removed from the valve-stem at the desired points both in opening and closing the valve and that the danger to the apparatus is reduced to a minimum.

What I claim is—

1. In combination a device having a limited range of movement, a motor for operating the same, an electrically-operated clutch between said motor and said device, a self-opening switch for completing the clutch-circuit and a contact device moving with said device for breaking said circuit.

2. In combination, a device having a limited range of movement, a motor for operating the same, an electrically-operated clutch between said motor and said device, a spring-retracted switch for completing the clutch-circuit, and a contact moving with said device for breaking said circuit.

3. In combination, a device having a limited range of movement, an electric motor for operating said device, an electrically-operated clutch between said motor and said device, a spring-retracted switch in said clutch-circuit, and means moving with said device for breaking said circuit at the proper times, and a reversing-switch for said motor.

4. In combination, a device having a limited range of movement, a motor A, an electrically-operated clutch B, a spring-retracted switch 10 and a circuit-breaking device K, said switch 10 and device K controlling the clutch B.

SAMUEL GILBERT COLT.

Witnesses:
HERBERT W. SMITH,
JOHN F. KELLY.